United States Patent
Shimoda

(10) Patent No.: US 7,228,043 B2
(45) Date of Patent: Jun. 5, 2007

(54) OPTICAL WAVEGUIDE CIRCUIT AND MANUFACTURING METHOD THEREOF

(75) Inventor: Tsuyoshi Shimoda, Tokyo (JP)

(73) Assignee: NEC Corporation, Tokyo (JP)

( * ) Notice: Subject to any disclaimer, the term of this patent is extended or adjusted under 35 U.S.C. 154(b) by 343 days.

(21) Appl. No.: 10/518,510

(22) PCT Filed: Jun. 20, 2003

(86) PCT No.: PCT/JP03/07856

§ 371 (c)(1), (2), (4) Date: Dec. 21, 2004

(87) PCT Pub. No.: WO04/001464

PCT Pub. Date: Dec. 31, 2003

(65) Prior Publication Data

US 2005/0213913 A1 Sep. 29, 2005

(30) Foreign Application Priority Data

Jun. 21, 2002 (JP) .............................. 2002-180913

(51) Int. Cl.
  G02B 6/10 (2006.01)
  H01L 21/00 (2006.01)
  C03B 37/023 (2006.01)
(52) U.S. Cl. .................. 385/131; 385/14; 385/37; 385/129; 385/130; 385/132; 385/141; 438/29; 438/31; 438/32; 438/38; 65/385; 65/386
(58) Field of Classification Search ................ 385/14, 385/123, 126, 37, 129, 130, 131, 132, 141; 438/29, 31, 32, 38; 65/385, 386
See application file for complete search history.

(56) References Cited

U.S. PATENT DOCUMENTS

| 5,106,211 | A  | * | 4/1992 | Chiang et al. .............. 385/132 |
| 5,143,577 | A  | * | 9/1992 | Haas et al. .................... 216/24 |
| 6,788,853 | B2 | * | 9/2004 | Steinberg et al. ............. 385/49 |
| 6,850,683 | B2 | * | 2/2005 | Lee et al. .................... 385/129 |
| 6,895,158 | B2 | * | 5/2005 | Aylward et al. ............. 385/133 |
| 2003/0026571 | A1 | * | 2/2003 | Bazylenko .................. 385/129 |
| 2004/0120677 | A1 | * | 6/2004 | Mo Kang et al. ........... 385/129 |
| 2005/0213913 | A1 | * | 9/2005 | Shimoda ..................... 385/129 |

FOREIGN PATENT DOCUMENTS

| JP | 3-158802 | 7/1991 | ............. 385/129 X |
| JP | 5-188231 | 7/1993 | ............. 385/129 X |
| JP | 5-224050 | 9/1993 | ............. 385/129 X |
| JP | 9-73021  | 3/1997 | ............. 385/129 X |

(Continued)

*Primary Examiner*—Brian M. Healy
(74) *Attorney, Agent, or Firm*—Young & Thompson

(57) ABSTRACT

An optical waveguide circuit comprising a plurality of first cores (203) arranged at intervals widening as they are away from the branch point or the joining point of optical signal, a clad (205) filling at least these first cores, and second cores (204) provided between the first cores and the clad and formed in the gap between the first cores in the vicinity of the branch point or the joining point while covering the first cores at least partially. Refractive index of the second core is larger than that of the clad, the boundary between the second core and the clad is smooth and the film thickness of the second core formed in the gap between the first cores is decreased as the interval of the plurality of first cores widens.

21 Claims, 13 Drawing Sheets

FOREIGN PATENT DOCUMENTS

| | | | | |
|---|---|---|---|---|
| JP | 10-160976 | 6/1998 | ............ | 385/129 X |
| JP | 2000-147283 | 5/2000 | ............ | 385/129 X |
| JP | 2001-74959 | 3/2001 | ............ | 385/129 X |
| JP | 2001-255427 | 9/2001 | ............ | 385/129 X |

* cited by examiner

US 7,228,043 B2

OPTICAL WAVEGUIDE CIRCUIT AND MANUFACTURING METHOD THEREOF

TECHNICAL FIELD

The present invention relates to an optical waveguide circuit used for optical communications and a manufacturing method thereof and particularly, to an optical waveguide circuit having a branch portion and a manufacturing method thereof.

BACKGROUND ART

An optical waveguide circuit, especially, a Planar Lightwave Circuit (PLC) in which an optical waveguide was formed on a planar surface has been extensively used as a key device for supporting a recent optical communication network system. In particular, passive device such as an optical multi/demultiplexer or an optical branch device using a silica optical waveguide has become indispensable for practical application of a low-priced and high-performance system in the fields from a backbone network represented by a large-capacity optical communication to an access-based network and have already been put into practical use and commercial mass production.

As an example of the PLC, an Arrayed Waveguide Grating (AWG) is shown in FIGS. 27 and 28. FIG. 27 is a top view of the AWG device; and FIG. 28 is a cross-sectional view taken along the line VIIIb—VIIIb in FIG. 27. This device has, at the inside of cladding layers thereof constituted by lower cladding 802 and upper cladding 804 formed on substrate 801, a waveguide 811 that propagates a wavelength-multiplexed optical signal, a first slab waveguide 812 connected to the waveguide 811, a waveguide 815 that separately propagates optical signals of different wavelengths, a second slab waveguide 814 connected to the waveguide 815, and arrayed waveguides 813 that connect the first slab waveguide 812 and second slab waveguide 815. The device has a function of demultiplexing the wavelength-multiplexed optical signal into different wavelengths, or contrary, multiplexing optical signals of different wavelengths onto one optical fiber. In this configuration, as shown in FIG. 28, the upper portions of cores 803 and gaps between the cores 803 in the arrayed waveguides 813 are covered by the upper cladding 804.

An operational principle of the device will be briefly described below with the case of demultiplex taken as an example.

A wavelength-multiplexed optical signal incident into the waveguide 811 is scattered by diffraction in the first slab waveguide 812 and enters the arrayed waveguides 813 having a plurality of cores 803. Since optical path-length differences are provided between adjacent waveguides of the arrayed waveguides 813, the tilt of a wave front that is propagated through the arrayed waveguide differs depending on the wavelength. The optical signals emitted from the arrayed waveguides 813 are directed into the second slab waveguide 814, where the optical signal is collected for each output channel according to the tilt. The each collected optical signal is then wavelength demultiplexed, and output from the waveguide 815.

As another example of the PLC, a coupler is shown in FIGS. 29 and 30. FIG. 29 is a top view of the coupler; and FIG. 30 is a cross-sectional view taken along the line IXb—IXb in FIG. 29. The coupler has a configuration in which two waveguides (cores 903) are nearby arranged to each other in proximity waveguides area 912 having length L and is widely used as an optical communication device such as light branching, light converging, wavelength filter, or optical switch using thermooptic effect. In the case of light branching, an optical signal entering from input waveguide 911 in FIG. 29 and the adjacent waveguide interfere with each other in the proximity waveguides area 912 having the coupling length L to allow the optical signal to diverge into two. The resultant optical signals are then output from output waveguides 913A and 913B, respectively. The splitting ratio in this case can be changed depending on the length L.

Also in this configuration, as shown in FIG. 30, the upper portions of the two cores 903 formed on the lower cladding 902 on the substrate 901 and the gap between the adjacent cores are covered by the upper cladding 904 in the proximity waveguides area 912.

Currently, there is request to develop an optical waveguide circuit such as the abovementioned AWG or coupler having low insertion loss and having a reduced size. For example, the insertion loss in the PLC device is required to be minimized as much as possible for convenience of system design. At the same time, the size of the device is required to be reduced as much as possible for cost reduction in manufacturing of the device or integration of functions.

In particular, reduction of propagation loss is a common subject in the reduction of the insertion loss in the PLC device. One of the major factors of the propagation loss in the PLC is uneven shape of a boundary surface between the core and cladding, that is, scattering loss due to surface roughness. FIGS. 31, 32 and 33 schematically show the roughness on a boundary surface between core 1003 and upper cladding 1004. FIG. 31 is a top view showing roughness on the core-side surface of the PLC device; FIG. 32 is a cross-sectional view taken along the line Xb—Xb in FIG. 31; and FIG. 33 is a cross-sectional view taken along the line Xc—Xc of FIG. 31. The surface roughness on the core 1003 formed on lower cladding 1002 on substrate 1001 is caused by film surface roughness that has occurred at the time of coating of core layer or pattern roughness due to photolithography and etching at the time of patterning of the core.

In order to reduce the size of the PLC device, it is effective to increase the core-cladding refractive index difference $\Delta$ and to decrease the minimum curvature radius of the waveguide. However, in particular, the more the core-cladding refractive index difference $\Delta$ is increased, the more the scattering loss tends to be increased. Therefore, when the core-cladding refractive index difference $\Delta$ is increased for miniaturization of the device, the core surface must be smoothed for suppressing the scattering loss.

Further, radiation loss arising at a branch point (diverging point) is a major problem particularly in the AWG. The radiation loss at a branch point of the AWG, that is, at a coupling portion between the slab and array accounts for approximately half of the insertion loss in the entire AWG. In order to reduce the radiation loss at a branch portion, it is effective to reduce the distance between the split cores that have branched at a branch point. However, limitation of the accuracy in the photolithography or etching process forces the split cores to be spaced at least about 1 μm apart in general. As shown in FIG. 28, the cladding material is filled in between the cores 803 in general and the boundary between the core 803 and cladding 804 is well-defined. Therefore, most of the signal light that enters the gaps between the sprit cores after propagating through the slab waveguide 812 is introduced into the cladding, which causes the radiation loss. The same can be said for the case where the signal lights enter the slab waveguide 814 from arrayed waveguides 813.

To cope with the problem of the radiation loss arising in the AWG, a publication of patent applications (JP 2000-147283A) has disclosed a configuration in which, as shown in FIGS. 35 and 36 that show cross-sectional views taken along the lines XIb—XIb and XIc—XIc in FIG. 34 respectively, buried layer 1101 having a refractive index higher than the refractive index of claddings 802 and 804 and lower than that of cores 803 is formed between the cores 803 and the thickness of the buried layer 1101 becomes thinner as the distance between the cores becomes wider. With this configuration, the electromagnetic field distribution between the cores 803 at the coupling portion between the slab waveguide 812 and arrayed waveguides 803 is gradually changed to reduce the radiation loss at the branch point. However, in this configuration, the shape greatly depends upon etching condition and consequently, manufacture of a device is difficult, which may result in variation of the shape in a wafer surface or between wafers. Note that, first slab waveguide 812, arrayed waveguides 813, and second slab waveguide 814 are formed between input waveguide 811 and output waveguide 815. Lower cladding 802 is formed on substrate 801.

On the other hand, a problem lies in that the coupling length L of the directional coupler becomes longer especially when the refractive index difference Δ between the core 903 and claddings 902, 904 is increased. That is, although it is effective to increase Δ and decrease the minimum curvature radius of the waveguide for the miniaturization of the device, the increase of Δ strengthens the state where the signal light is confined in the core. Accordingly, the interference to the proximity waveguide is reduced, with the result that it becomes necessary to increase the coupling length L for obtaining a desired splitting ratio. It is possible to reduce the coupling length by narrowing the distance between the proximity waveguides (that is, distance between the cores 903 in the proximity waveguides area 912). However, the distance between the waveguides is restricted by the accuracy in the photolithography or etching process, so that the coupling length needs to be increased.

The present invention has been made to solve the above problems and an object thereof is to reduce loss in the optical waveguide circuit, and to reduce the device size as well as to increase the degree of integration.

DISCLOSURE OF THE INVENTION

To achieve the above object, according to a first aspect of the present invention, there is provided an optical waveguide circuit including: a first core; a cladding that buries the first core; and a second core that is formed between the first core and cladding and covers at least a part of the first core, wherein the refractive index of the second core is higher than the refractive index of the cladding, and the boundary between the second core and cladding is made smooth. In the present invention, by making the boundary between the second core and cladding smooth, propagation loss in the optical waveguide can be reduced.

In the optical waveguide circuit according to the present invention, when the first core that is covered by the second core has a substantially rectangular cross-section, the second core covers, for example, the upper surface and both side surfaces of the first core.

It is possible to set the thickness of the second core at a value less than or equal to twice the thickness of the first core.

Further, the second core having a refractive index higher than the refractive index of the cladding constitutes the core of the optical waveguide together with the first core. Therefore, it is preferable that the refractive index of the second core be near that of the first core. For example, it is possible to set the refractive index of the second core at a value less than or equal to 1.01 times that of the first core.

According to a second aspect of the present invention, there is provided an optical waveguide circuit that allows an optical signal propagating through at least one optical waveguide to branch into a plurality of optical waveguides, or converges optical signals propagating through a plurality of waveguides into at least one optical waveguide, the plurality of optical waveguides including: a plurality of first cores each interval of which becomes wider as the first cores get away from a branch point or converging point of an optical signal; a cladding that buries at least the first cores; a second core that is so formed between the first cores and cladding as to cover up at least a part of each of the first cores and is formed in the gaps between the first cores at the position in the vicinity of the branch point or converging point, wherein the refractive index of the second core is higher than the refractive index of the cladding, the boundary between the second core and cladding is made smooth, and the film thickness of the second core formed in the gaps between the first cores becomes thinner as the interval between the first cores becomes wider.

The optical waveguide circuit described above can be used as a branch circuit that allows an optical signal to branch into a plurality of optical waveguides, or as a converging circuit that converges a plurality of waveguides. The above optical waveguide circuit can be configured as a Y-shaped branch circuit.

In the present invention, the second core whose film thickness gradually becomes thinner as each interval between the first cores becomes wider is provided between the first cores in the vicinity of the branch point or converging point of an optical signal. As a result, it is possible to obtain an advantage corresponding to that obtained by reducing the interval between the cores that branch at the branch point as much as possible. Further, since the boundary between the second core and cladding is made smooth, the radiation loss at the branch point and transmission loss in the optical waveguide can be reduced.

According to a third aspect of the present invention, there is provided an optical waveguide circuit including: a first slab waveguide connected at least one input waveguide; a second slab waveguide connected at least one output waveguide; and arrayed waveguides formed between the first and second waveguides with optical path length differences, the arrayed waveguides including: a plurality of first cores; a cladding that buries the first cores; a second core that is so formed between the first cores and cladding as to cover up at least a part of each of the first cores and that is formed in the gaps between the first cores at least at connection areas between the first and second slab waveguides and the arrayed waveguides and areas near the connection areas, wherein the refractive index of the second core is higher than the refractive index of the cladding, the boundary between the second core and cladding is made smooth, and the film thickness of the second core formed in the gaps between the first cores of the arrayed waveguides becomes thinner as each interval between the first cores becomes wider.

The above second core prevents the signal light that propagates through the first slab waveguide and enters the gaps between the first cores from being radiated into the cladding, thereby reducing the radiation loss.

According to a fourth aspect of the present invention, there is provided an optical waveguide comprising proximity waveguides in which a plurality of first cores are nearby arranged to each other, the proximity waveguides including: a plurality of first cores; a cladding that buries the first cores; and a second core that is formed between the first cores and cladding to cover up at least a part of each of the first cores and is formed in the gaps between the first cores, wherein the refractive index of the second core is higher than the refractive index of the cladding, and the boundary between the second core and cladding is made smooth.

The above optical waveguide circuit can be used as a coupler including at least two proximity waveguides. By providing the second core, even when the interval between the first cores of the proximity waveguides is not changed from the conventional optical waveguide circuit, it is possible to obtain an advantage corresponding to that obtained by reducing an interval between the proximity waveguides, so that the coupling length of the coupler can be shortened.

According to a fifth aspect of the present invention, there is provided a manufacturing method of an optical waveguide circuit, including at least the steps of: forming a core layer; selectively etching the core layer to form a first core; forming a second core layer that covers the upper surface and both side surfaces of the first core, the second core being made of a material having a refractive index higher than the refractive index of the cladding; applying a heat reflow to the second core layer to smooth the surface thereof to complete a second core; and forming the cladding on the second core.

According to a sixth aspect of the present invention, there is provided a manufacturing method of an optical waveguide circuit that allows an optical signal propagating through at least one optical waveguide to branch into a plurality of optical waveguides, or converges optical signals propagating through a plurality of optical waveguides into at least one optical waveguide, the method including at least the steps of: forming a core layer; selectively etching the core layer to form a plurality of first cores each interval of which becomes wider as the first cores get away from a branch point or converging point of an optical signal; forming a second core layer on the upper portion of each of the first cores and between the first cores at least at the area including the portion near the branch point or converging point of the first cores, the second core being made of a material having a refractive index higher than the refractive index of the cladding; applying a heat reflow to the second core layer to smooth the surface thereof and forming a second core such that the film thickness of the second core layer that is formed in the gaps between the first cores becomes thinner as the interval between the first cores becomes wider; and forming the cladding on the second core.

According to a seventh aspect of the present invention, there is provided a manufacturing method of an optical waveguide circuit including: a first slab waveguide connected at least one input waveguide; a second slab waveguide connected at least one output waveguide; and arrayed waveguides including a plurality of cores, and is formed between the first and second slab waveguides with optical path length differences, the method including at least the steps of: forming a core layer; selectively etching the core layer to form the plurality of first cores each interval of which becomes wider as the first cores get away from a connection point between the first and second slab waveguides; forming a second core layer on the upper portions of each of the first cores and between the first cores at least at the area including connection areas between the first and second slab waveguides and the first cores and the portion near the connection areas, the second core being made of a material having a refractive index higher than the refractive index of the cladding; applying a heat reflow to the second core layer to smooth the surface thereof and forming a second core such that the film thickness of the second core layer that is formed in the gaps between the first cores becomes thinner as the interval between the first cores becomes wider; and forming the cladding on the second core.

According to an eighth aspect of the present invention, there is provided a manufacturing method of an optical waveguide circuit including proximity waveguides in which a plurality of first cores are nearby arranged to each other, the method including at least the steps of: forming a core layer: selectively etching the core layer to form the plurality of first cores; forming a second core layer on the upper portion of each of the first cores and between the first cores at least the area including the proximity waveguides and the portion near the proximity waveguides, the second core layer being made of a material having a refractive index higher than the refractive index of the cladding; applying a heat reflow to the second core layer to smooth the surface thereof to obtain a second core; and forming the cladding on the second core.

According to the present invention, roughness in the vicinity of the boundary between the core and cladding can be smoothed, thereby reducing the propagation loss in the waveguide.

The present invention can gradually reduce the equivalent refractive index between the cores as the interval between the cores becomes wider. Further, it is possible to obtain a cross-section of the core smoother than in the conventional optical waveguide circuit. As a result, the scattering loss at the portion near the branch point in the branch circuit or converging circuit can be reduced.

Further, according to the present invention, it is possible to increase effusion of a propagating light into between the cores in proximity waveguide area, so that the coupling length of the coupler or the like can be shortened..

The present invention can be used to reduce loss in a Y-shaped branch circuit or arrayed waveguide grating.

With the manufacturing method of the optical waveguide circuit according to the present invention, the optical waveguide circuit can be manufactured with a high yield.

BRIEF DESCRIPTION OF THE DRAWINGS

FIG. 3 is a cross-sectional view taken along the line XIb—XIb in FIG. 34; and

BEST MODE FOR CARRYING OUT THE INVENTION

Embodiments of the present invention will be described in detail below with reference to the accompanying drawings.

[First Embodiment]

Figure 1:
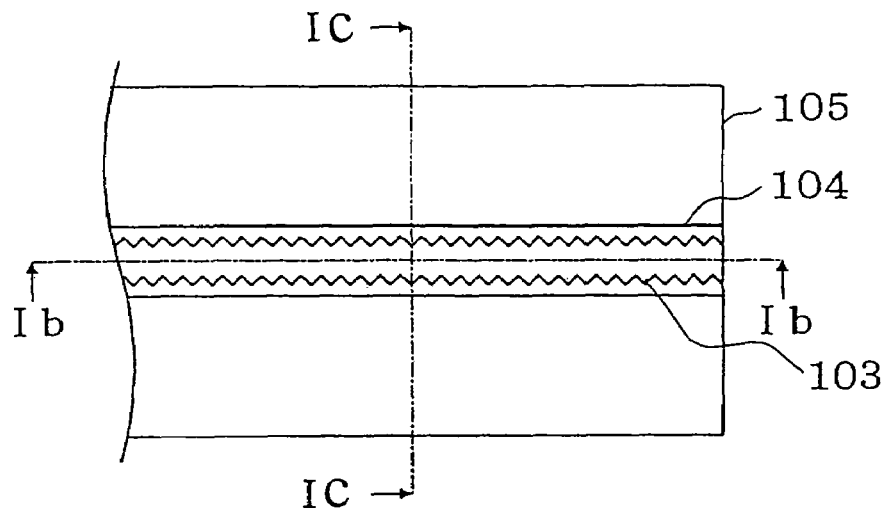
FIG. 1 is a top view showing an optical waveguide according to a first embodiment of the present invention.
Figure 2:
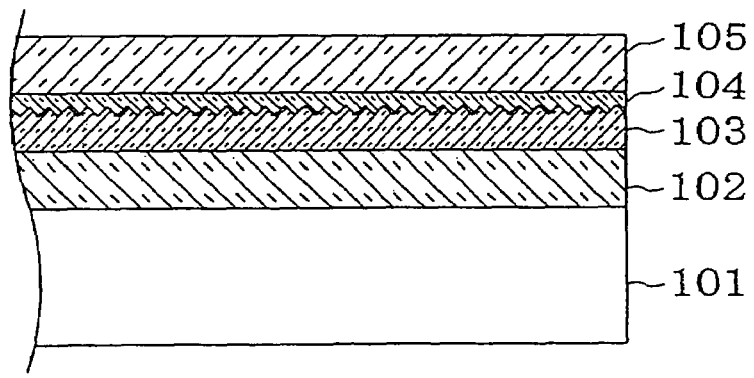
FIG. 2 is a cross-sectional view taken along the line Ib—Ib in FIG. 1.
Figure 3:
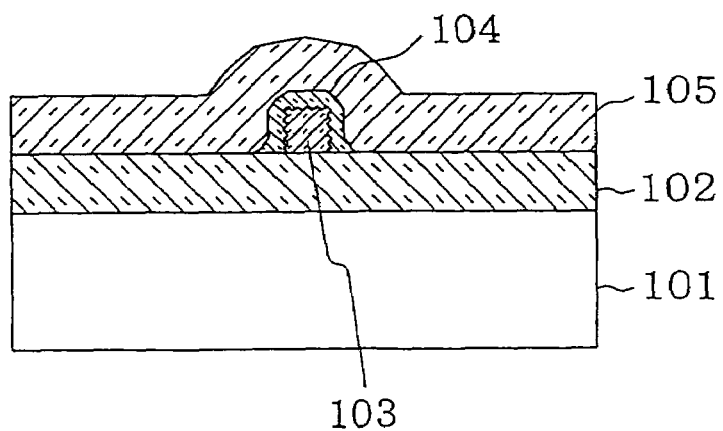
FIG. 3 is a cross-sectional view taken along the line Ic—Ic in FIG. 1.

An optical waveguide according to a first embodiment of the present invention is shown in FIGS. 1, 2 and 3. FIG. 1 is a top view; FIG. 2 is a cross-sectional view taken along the line Ib—Ib in FIG. 1; and FIG. 3 is a cross-sectional view taken along the line Ic—Ic in FIG. 1.

The optical waveguide includes lower cladding 102 formed on substrate 101, first core 103 formed on the lower cladding 102 and having a substantially rectangular cross-section, second core 104 that covers the upper surface and both side surfaces of the first core 103, upper cladding 105 so formed on the lower cladding 102 as to cover up the first and second cores 103 and 104.

The surface of the second core 104 is made smooth. Roughness occurs on the surface of the first cladding 103 at its formation time. However, by providing the second core 104 between the first core 103 and upper cladding 105 and by making the boundary surface between the second core 104 and upper cladding 105 more smooth than that between the second core 104 and first core 103, it is possible to smooth the surface roughness of the first core 103 in terms of results, thereby reducing the scattering loss due to roughness on the core surface. Accordingly, even when the core-cladding refractive index difference Δ is increased for the miniaturization of the device, it is possible to reduce an increase in the scattering loss due to the increase in the core-cladding refractive index difference Δ. Therefore, the reduction in device size can be realized while reducing an increase in the waveguide propagation loss.

The refractive index of the second core 104 needs to be higher than that of the upper cladding 105. However, when the refractive index of the second core 104 is too high, a change in a propagation constant caused by the second core 104 becomes large. Therefore, it is preferable that the refractive index of the second core 104 be near that of the first core 103. More concretely, it is desirable that the refractive index of the second core 104 be less than or equal to 1.01 times that of the first core 103.

The film thickness of the second core 104 should be larger than the depth of the roughness on the upper or side surface of the core 103. However, when the film thickness of the second core 104 is too large, a change in a propagation constant caused by the second core 104 becomes large. Therefore, it is preferable that the film thickness of the second core 104 be less than or equal to 2 times that of the core 103.

A concrete example of the first embodiment will be described below. A silicon substrate is used as the substrate 101. A silica-based material prepared by doping boron and phosphorus (BPSG) is used as the materials of the lower and upper claddings 102 and 105. The film thicknesses of each of the lower and upper claddings 102 and 105 is set to 10 μm, and the refractive index thereof is set to 1.450. Silicon oxynitride (SiON) is used as the material of the first core 103. Both the thickness and width of the first core 103 are set to 3 μm. The refractive index thereof is set to 1.480. As a result, the refractive index difference Δ between the first core 103 and the claddings 102, 105 is set to 2%. BPSG is used as the material of the second core 104. The film thickness of the second core 104 is set to 0.5 μm, and the refractive index thereof is set to 1.480, which is the same value as that of the first core 103.

A heat reflow is applied to smooth the surface of the second core 104. The reason of selecting the BPSG as the material of the second core 104 is that the softening temperature thereof is lower than that of the first core 103. That is, it is necessary for the material of the second core 104 to have the softening temperature lower than that of the first core 103 in order to smooth the surface of the second core 104 without deforming the shape of the first core 103 at the time of the heat reflow.

With the above configuration, the depth of the surface roughness of the second core 104 can be reduced to 10 nm or less although the depth of the surface roughness of the first core 103 is about 100 nm in the case where the second core 104 is not provided. As a result, the waveguide propagation loss is reduced from 0.2 dB/cm, which is obtained in the case where the second core is not provided, to 0.04 dB/cm.

In the first embodiment, the second core 104 covers the upper surface and both side surfaces of the first core 103. However, the second core 104 may cover at least a part of the first core 103. The second core 104 may further cover the lower surface of the first core 103 in addition to the upper and both side surfaces thereof.

[Second Embodiment]

Figure 4:
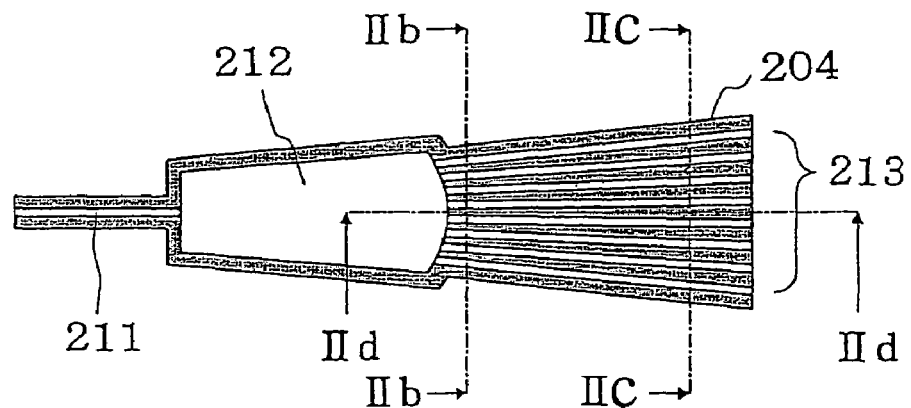
FIG. 4 is a top view showing an optical waveguide circuit according to a second embodiment of the present invention.
Figure 5:
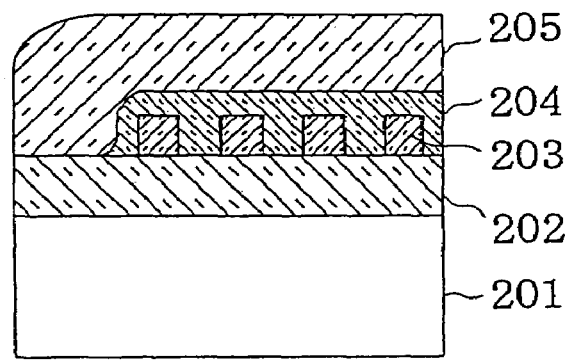
FIG. 5 is a cross-sectional view taken along the line IIb—IIb in FIG. 4.
Figure 6:
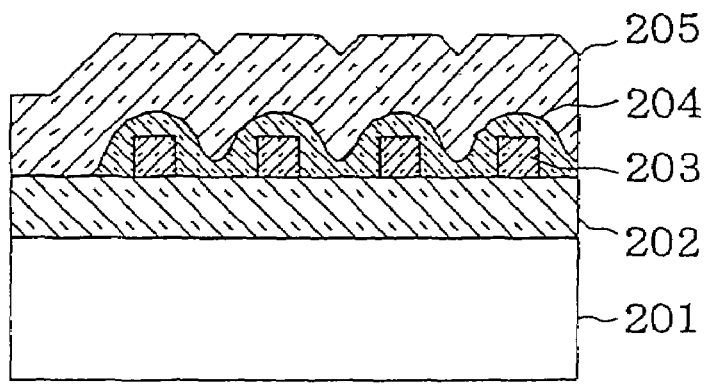
FIG. 6 is a cross-sectional view taken along the line IIc—IIc in FIG. 4.
Figure 7:
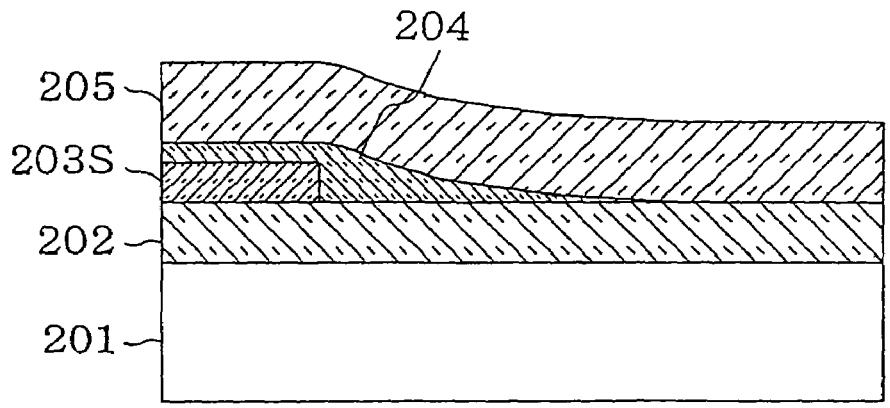
FIG. 7 is a cross-sectional view taken along the line IId—IId in FIG. 4.

An optical waveguide circuit according to a second embodiment of the present invention is shown in FIGS. 4, 5, 6 and 7. FIG. 4 is a top view; FIG. 5 is a cross-sectional view taken along the line IIb—IIb in FIG. 4; FIG. 6 is a cross-sectional view taken along the line IIc—IIc in FIG. 4; and FIG. 7 is a cross sectional view taken along the line IId—IId in FIG. 4.

The optical waveguide circuit allows an optical signal to branch from one or more optical waveguides 211 to a plurality of optical waveguides 213, or allows a plurality of optical signals to converge from a plurality of optical waveguides 213 to one or more optical waveguides 211. That is, the optical waveguide circuit can be used as a branch circuit that allows an optical signal to branch into a plurality of optical waveguides 213, or as a converging circuit that converges a plurality of optical waveguides 213. Note that the optical waveguide circuit can be used as a branch circuit or converging circuit for an optical signal having a single-wavelength or a plurality of optical signals having different wavelengths.

The plurality of optical waveguides 213 include lower cladding 202 formed on substrate 201, a plurality of first cores 203 formed on the lower cladding 202 such that each interval between first cores 203 becomes wider as the first cores 203 get away from a connection area between the plurality of optical waveguides 213 and slab waveguide 212 which is the branch point or converging point of an optical signal, second core 204 that covers the upper and both side surfaces of each of the first cores 203 and that is formed in a gap between each adjacent pair of first cores 203 at the portion near the connection area between the slab waveguide 212 and the plurality of optical waveguides 213, and upper cladding 205 so formed on the lower cladding 202 as to bury the first and second cores 203 and 204.

As in the case of the first embodiment, the refractive index of the second core 204 is higher than those of the claddings 202 and 205, and the boundary between the second core 204 and cladding 205 is made smooth.

Figure 34:
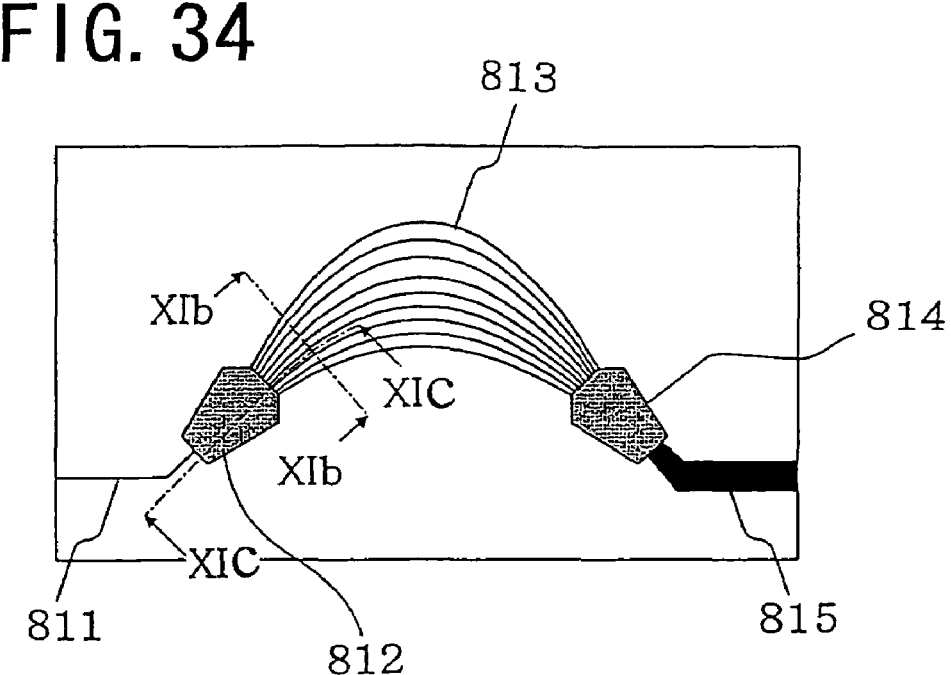
FIG. 34 is a top view showing a conventional optical waveguide circuit.
Figure 35:
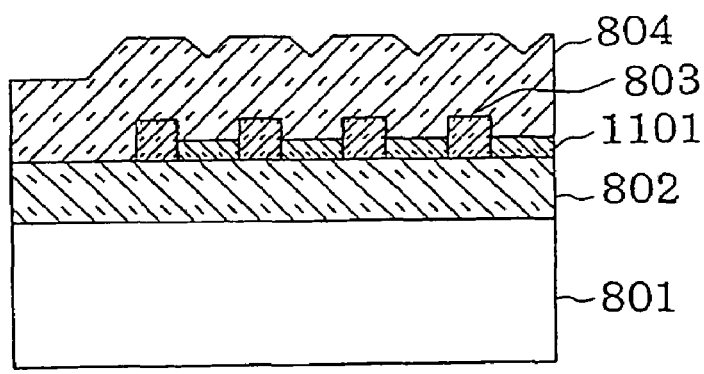
Figure 36:
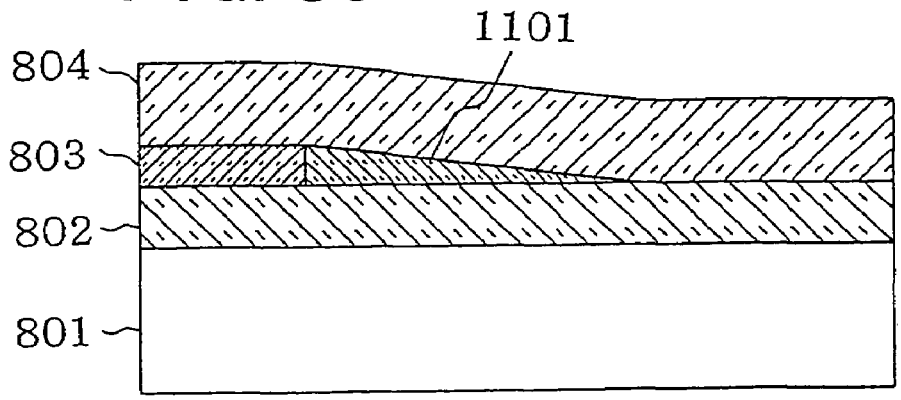
FIG. 36 is a cross-sectional view taken along the line XIc—XIc in FIG. 34.

The second core 204 is formed from the upper portion of a first core 203S of the slab waveguide 212 to the upper portions of the first cores 203 of the optical waveguides 213. The film thickness of the second core 204 formed between the first cores 203 becomes thinner as an interval between each adjacent pair of first cores 203 becomes wider. By forming the second core 204 as described above, a configuration in which an interval between each adjacent pair of the cores smoothly increases from 0 is got. The configuration as described above can be obtained by, for example, an application of the heat reflow process after film formation of the second core 204. The above configuration may be realized by an application of a spin-coating of a liquid material such as polymer resin or spin-on-glass resin. This configuration gradually reduces the equivalent refractive index between the cores in the waveguides 212 and 213 and consequently, prevents radiation from occurring at the branch point or converging point. Further, as compared to the conventional example of the optical waveguide circuit shown in FIGS. 34 to 36, it can be seen that the second core 204 is formed also on the upper portions of the first cores 203 and 203S, and the boundary surface between the second core 204 and upper cladding 205 has a smooth curved surface. Therefore, an advantage of a low Polarization Dependant Loss (PDL) can be obtained.

As described above, in the second embodiment, the second core 204 whose film thickness gradually becomes thinner as an interval between the adjacent pair of the first cores becomes wider is provided between the first cores 203 in the vicinity of the branch point or converging point of an optical signal. As a result, it is possible to obtain an advantage equivalent to that obtained by reducing an interval between the cores that branch at the branch point as much as possible. Further, since the boundary between the second core 204 and the cladding is made smooth, the radiation loss at the branch point and transmission loss in the optical waveguide can be reduced.

A concrete example of the second embodiment will be described below. The optical waveguide circuit is configured as a star-shaped branch circuit having 1-input and 8-outputs. The material of the substrate, the material and size of each waveguide layers, the refractive index and the like are the same as those in the first embodiment. Each interval between the first cores 203 at the connection point between the plurality of optical waveguides 213 and slab waveguide 212 is set to 1 µm. The interval between the first cores 204 is allowed to spread up to 20 µm with the assumption that the propagation length z from a connection point between the slab waveguide 212 and the plurality of optical waveguides 213 is 500 µm. The thickness of the second core 204 at the central portion between each adjacent pair of the first cores 203 is allowed to be slowly reduced from 4 µm at the connection area between the slab waveguide 212 and the plurality of optical waveguides 213 to 0 µm at the propagation length z of 500 µm. As a result, total excess loss corresponding to all 8-channel outputs can be reduced from 1.0 dB, which is obtained in the case where the second core 204 is not provided, to 0.2 dB. Further, the obtained PDL is as quite low as 0.05 dB or less.

[Third Embodiment]

Figure 8:
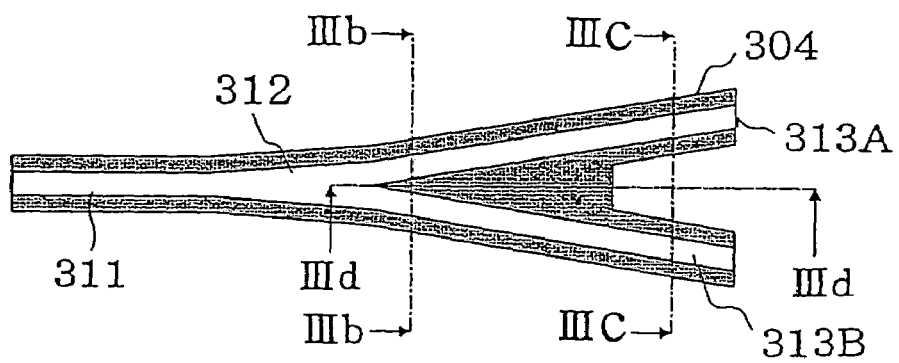
FIG. 8 is a top view showing an optical waveguide circuit according to a third embodiment of the present invention.
Figure 9:
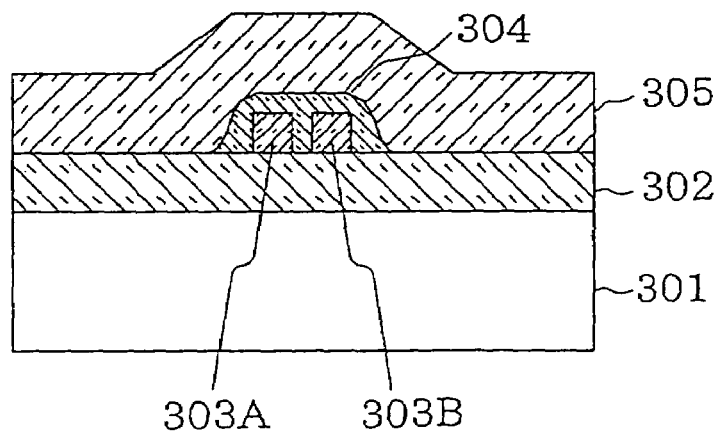
FIG. 9 is a cross-sectional view taken along the line IIIb—IIIb in FIG. 8.
Figure 10:
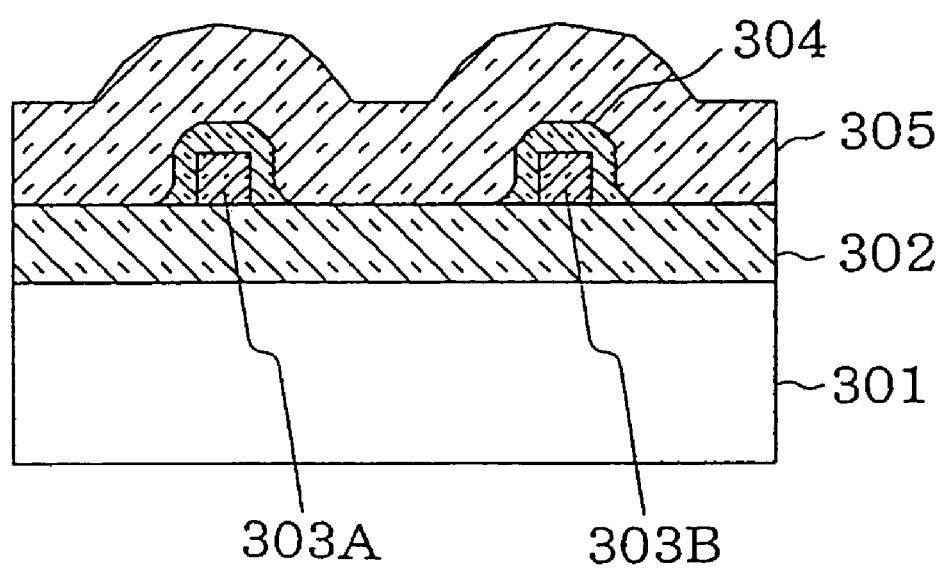
FIG. 10 is a cross-sectional view taken along the line IIIc—IIIc in FIG. 8.
Figure 11:
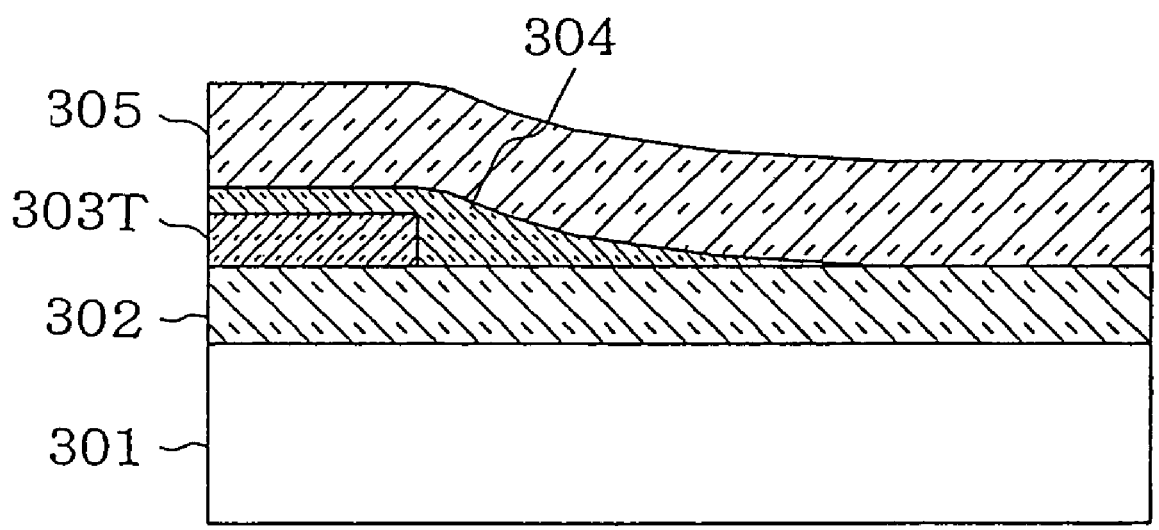
FIG. 11 is a cross-sectional view taken along the line IIId—IIId in FIG. 8.

An optical waveguide circuit according to a third embodiment of the present invention is shown in FIGS. 8 to 11. FIG. 8 is a top view; FIG. 9 is a cross-sectional view taken along the line IIIb—IIIb in FIG. 8; FIG. 10 is a cross-sectional view taken along the line IIIc—IIIc in FIG. 8; and FIG. 11 is a cross-sectional view taken along the line IIId—IIId in FIG. 8.

The configuration of the optical waveguide circuit is obtained by modifying the second embodiment. More specifically, 1-input and 2-outputs circuit, that is, Y-branch type circuit is applied to the configuration of the second embodiment.

A concrete example of the third embodiment will be described below. The material of the substrate, the material and size of each waveguide layers, the refractive index and the like are the same as those in the first embodiment. Lower cladding 302 is formed on substrate 301. On the lower cladding 302, first cores 303 (303A, 303B, 303T), second core 304, and upper cladding 305 are sequentially formed. Waveguide 311 branches into two waveguides 313A and 313B through taper waveguide 312.

The interval between the first core 303A of the waveguide 313A and the first core 303B of the waveguide 313B at a connection point between two waveguides 313A and 313B and taper waveguide 312 is set to 1 µm. The first core 303T denotes the first core of the taper waveguide 312. The interval between the cores 303A and 303B that diverge from the core 303T is allowed to spread up to 20 µm with the assumption that the propagation length z from the connection point between the taper waveguide 312 and two waveguides 313A and 313B is 300 µm. The thickness of the second core 304 at the central portion between the first cores 303 is allowed to be slowly reduced from 4 µm at the connection area between the taper waveguide 312 and two waveguides 313A and 313B to 0 µm at the propagation length z of 300 µm. As a result, total excess loss corresponding to 2-channel outputs can be reduced from 0.5 dB, which is obtained in the case where the second core 304 is not provided, to 0.1 dB. Further, the obtained PDL is as quite low as 0.05 dB or less.

[Fourth Embodiment]

Figure 12:
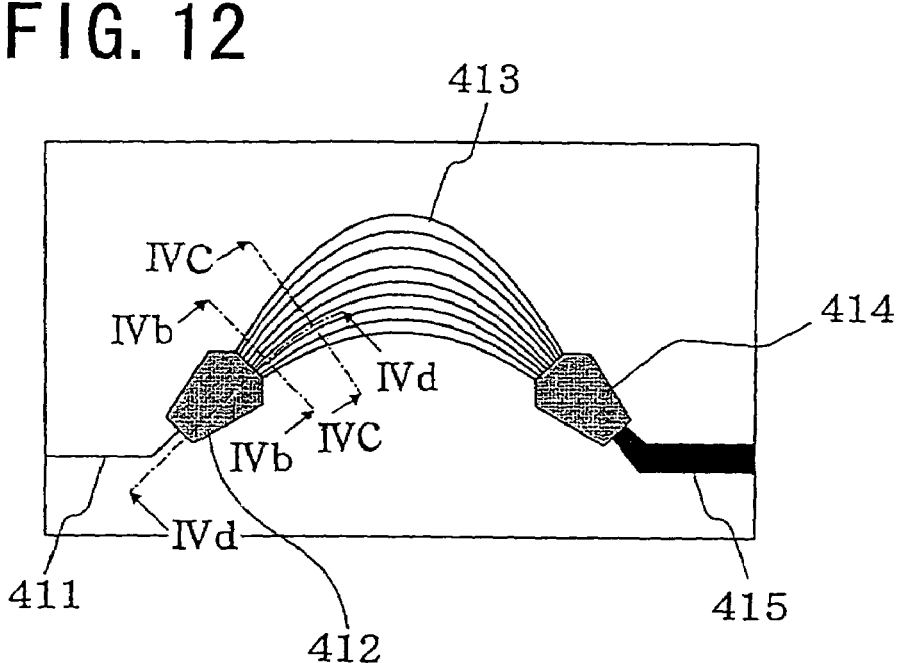
FIG. 12 is a top view showing an optical waveguide circuit according to a fourth embodiment of the present invention.
Figure 13:
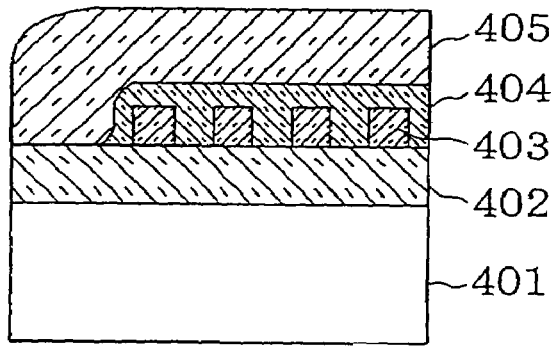
FIG. 13 is a cross-sectional view taken along the line IVb—IVb in FIG. 12.
Figure 14:
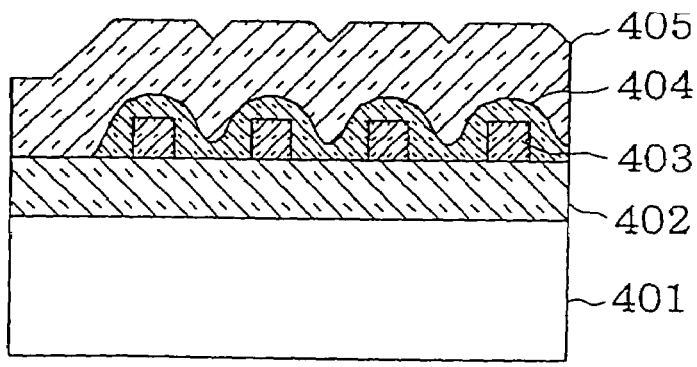
FIG. 14 is a cross-sectional view taken along the line IVc—IVc in FIG. 12.
Figure 15:
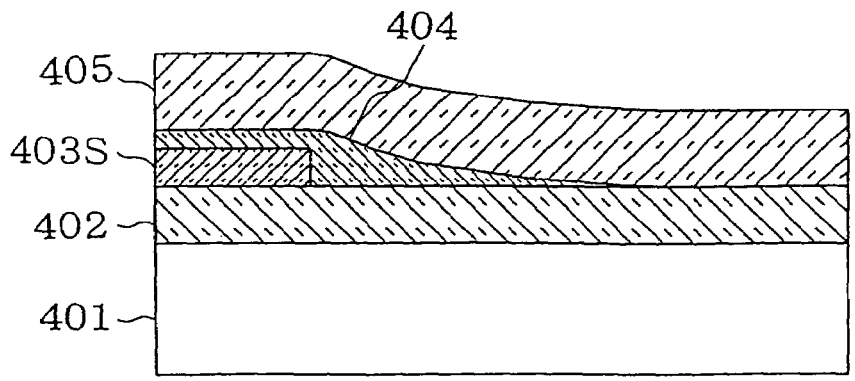
FIG. 15 is a cross-sectional view taken along the line IVd—IVd in FIG. 12.

An optical waveguide circuit according to a fourth embodiment of the present invention is shown in FIGS. 12 to 15. FIG. 12 is a top view; FIG. 13 is a cross-sectional view taken along the line IVb—IVb in FIG. 12; FIG. 14 is a cross-sectional view taken along the line IVc—IVc in FIG. 12; and FIG. 15 is a cross-sectional view taken along the line IVd—IVd in FIG. 12.

The optical waveguide circuit is obtained by applying the configuration of the optical waveguide circuit of the second embodiment to an AWG and includes a first slab waveguide 412 connected to one or more input waveguide 411, a second slab waveguide 414 connected to one or more output waveguide 415, and arrayed waveguides 413 formed between the first and second slab waveguides with optical path length differences.

The arrayed waveguides 413 include lower cladding 402 formed on substrate 401, a plurality of first cores 403 formed on the lower cladding 402, second core 404 that covers the upper and both side surfaces of each of the first cores 403 and is formed between each adjacent pair of first cores 403 at least at connection areas between the first and second slab waveguides 412 and 414 and arrayed waveguides 413 and at the portion near the connection areas, and upper cladding 405 so formed on the lower cladding 402 as to bury the first and second cores 403 and 404. The refractive index of the second core 404 is higher than those of the claddings 402 and 405, and the boundaries between the second core 404 and claddings 402 and 405 are made smooth. The second core 404 is formed from the upper portion of a first core 403S of the slab waveguide 412 to the upper portions of the first cores 403 of the arrayed waveguides 413, and from the upper portion of the first core 403S of the slab waveguide 414 to the upper portions of the first cores 403 of the arrayed waveguides 413. The film thickness of the second core 404 formed between the first cores 403 of the arrayed waveguides 413 becomes thinner as each interval between the first cores 403 becomes wider. The formation of the second core 404 prevents the signal light that propagates through the first slab waveguide 412 and enters the gaps between the first cores 403 from being radiated into the claddings 402 and 405, thereby reducing the radiation loss.

A concrete example of the fourth embodiment will be described below. An AWG (channel interval: 100 GHz, number of channels: 4) is manufactured with parameters of the star-shaped branch circuit such as the material of the substrate, the material and size of each waveguide layers, the refractive index or the like being the same as those in the second embodiment. As a result, the AWG insertion loss can be reduced from 2.5 dB, which is obtained in the case where the second core 404 is not provided, to 1.0 dB. Further, the obtained PDL in the 1 nm transmission wavelength band is as much low as 0.15 dB or less.

[Fifth Embodiment]

Figure 16:
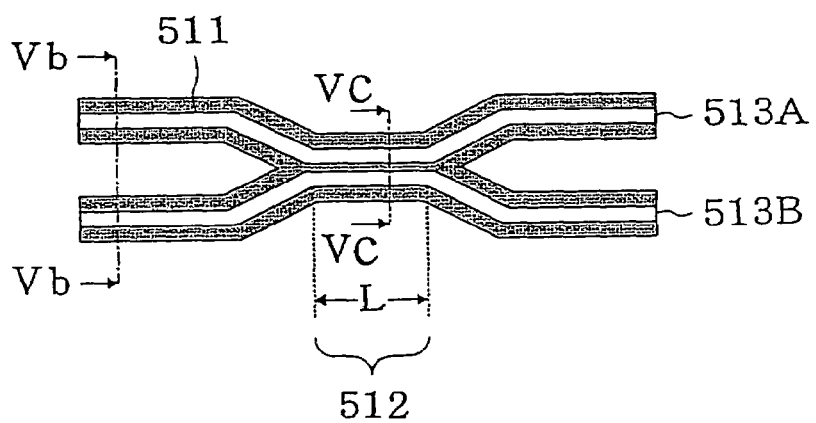
FIG. 16 is a top view showing an optical waveguide circuit according to a fifth embodiment of the present invention.
Figure 17:
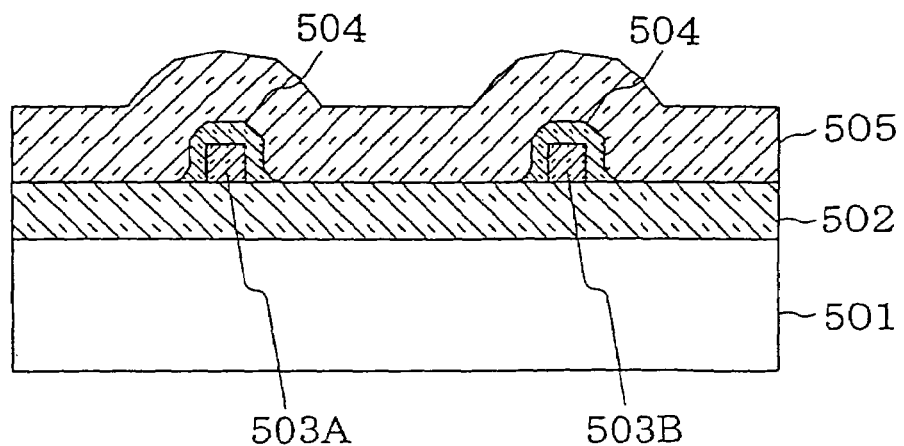
FIG. 17 is a cross-sectional view taken along the line Vb—Vb in FIG. 16.
Figure 18:
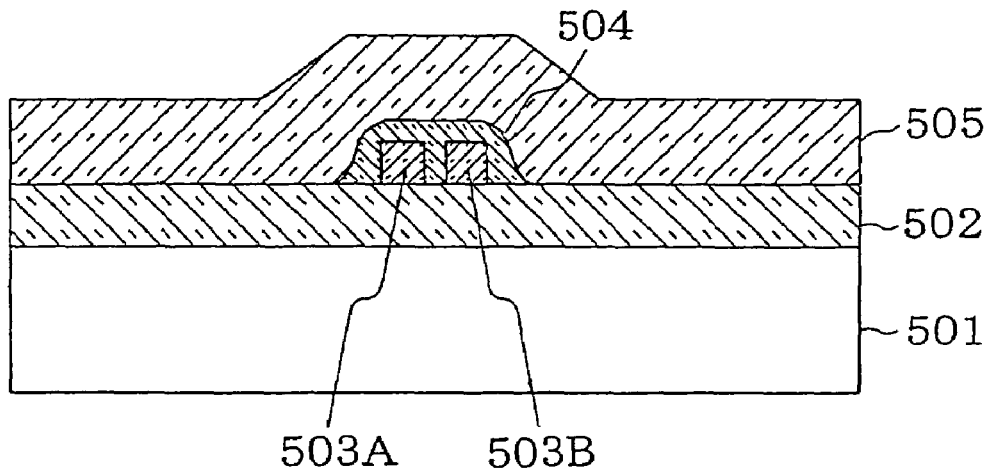
FIG. 18 is a cross-sectional view taken along the line Vc—Vc in FIG. 17.

An optical waveguide circuit according to a fifth embodiment of the present invention is shown in FIGS. 16 to 18. FIG. 16 is a top view; FIG. 17 is a cross-sectional view taken along the line Vb—Vb in FIG. 16; and FIG. 18 is a cross-sectional view taken along the line Vc—Vc in FIG. 16.

The optical waveguide circuit is a coupler including proximity waveguides 512 having a plurality of first cores 503A and 503B that are nearby arranged to each other. The proximity waveguides 512 have a coupling length L. The coupler includes input waveguide 511, proximity waveguides 512, and output waveguides 513A and 513B. The proximity waveguides 512 includes lower cladding 502 formed on substrate 501, a plurality of first cores 503A and 503B formed in parallel to each other on the lower cladding 502, second core 504 that covers at least a part of the first cores 503A and 503B respectively and is formed between the first cores 503A and 503B, and upper cladding 505 so formed on the lower cladding 502 as to bury the first cores 503A and 503B and second core 504.

A further description will be given of the second core 504. The second core 504 is formed in the area where the proximity waveguides 512 are formed and in the vicinity of the area so as to cover the upper surface and both side surfaces of each of the first cores 503A and 503B. Particularly in the area where the proximity waveguides 512 are formed, in which the interval between the first cores 503A and 503B is narrow, the gap between the first cores 503A and 503B is filled with the second core 504. The film thickness of the second core 504 at the portion between the first cores 503A and 503B becomes thinner as the first cores 503A and 503B get away from the formation area of the proximity waveguides 512 and the interval between the first cores 503A and 503B accordingly becomes wider. Note that it is only necessary for the film thickness of the second core 504 to sufficiently fill up the gap between the first cores in the formation area of the proximity waveguides 512. It is preferable that the refractive index of the second core 504 is higher than that of the upper cladding 505 and is lower than those of the first cores 503A and 503B. The boundary between the second core 504 and upper cladding 505 is made smooth.

The formation of the second core 504 can increase the equivalent refractive index between the first cores 503A and 503B in the formation area of the proximity waveguides 512 as compared to the area where the interval between the first cores is sufficiently large, resulting in reduction of Δ. Therefore, it is possible to increase effusion of a signal light from the first cores 503A and 503B. As a result, even when the interval between the first cores 503A and 503B of the proximity waveguides 512 is not changed from the conventional optical waveguide circuit, it is possible to obtain an advantage corresponding to that obtained by reducing an interval between the proximity waveguides 512, so that the coupling length L of the coupler can be shortened.

A concrete example of the fifth embodiment will be described below. A silicon substrate is used as the substrate 501. A BPSG is used as the materials of the lower and upper claddings 502 and 505. The film thicknesses of the lower and upper claddings 502 and 505 are set to 7 μm, and the refractive indexes thereof are set to 1.450. SiON is used as the materials of the first cores 503A and 503B. Both the thicknesses and widths of the first cores 503A and 503B are set to 2 μm. The refractive indexes thereof are set to 1.526, with the result that the refractive index differences Δ between the first cores 503A and 503B and claddings 502 and 505 are 5%, respectively. BPSG is used as the material of the second core 504. The film thickness of the second core 504 is set to 0.4 μm, and the refractive index thereof is set to 1.511. A heat reflow is applied to smooth the surface of the second core 504. The interval between the cores 503A and 503B at the formation area of the proximity waveguides 512 is set to 2 μm. As a result, the coupling length L required for the waveguide circuit, in which a signal light input through the input waveguide 511 is allowed to branch into the output waveguides 513A and 513B for output, is shortened from 1,500 μm, which is obtained in the case where the second core 504 is not provided, to 200 μm.

[Sixth Embodiment]

Figure 19:
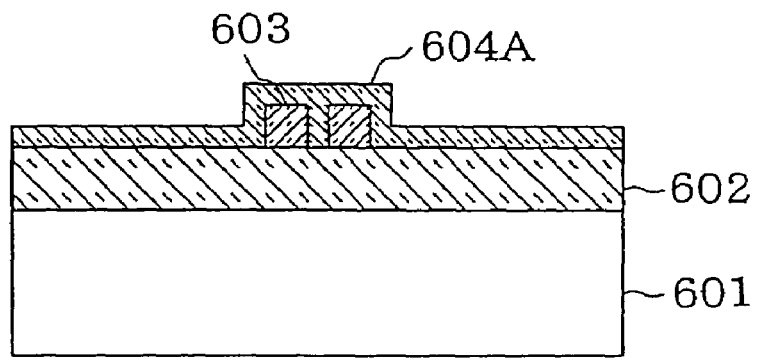
FIG. 19 is a cross-sectional view showing a method of manufacturing an optical waveguide circuit according to a sixth embodiment of the present invention in a step order.
Figure 21:
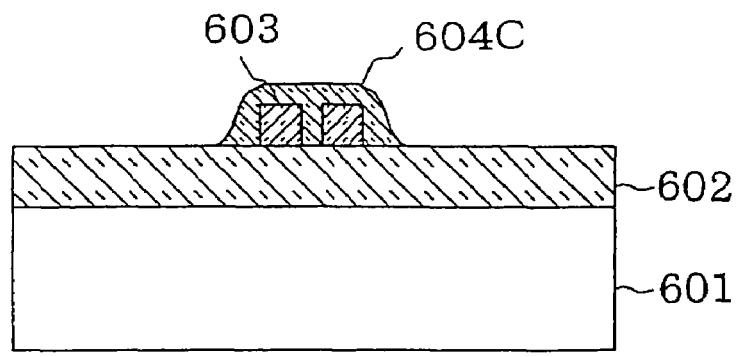
FIG. 21 is a cross-sectional view showing a method of manufacturing an optical waveguide circuit according to the sixth embodiment of the present invention in a step order.
Figure 22:
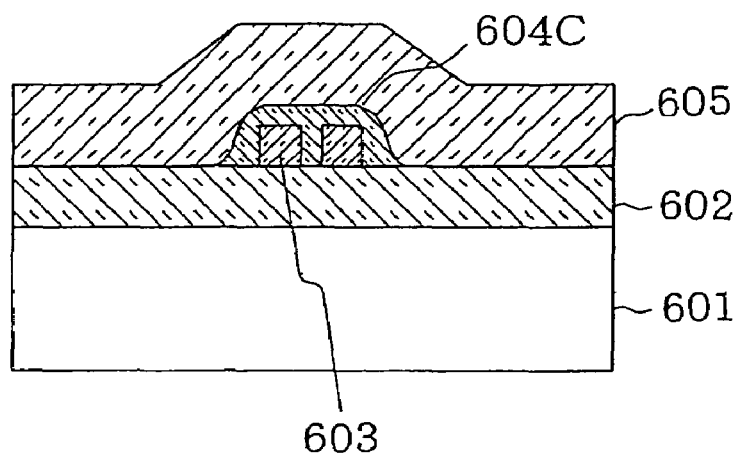
FIG. 22 is a cross-sectional view showing a method of manufacturing an optical waveguide circuit according to the sixth embodiment of the present invention in a step order.
Figure 23:
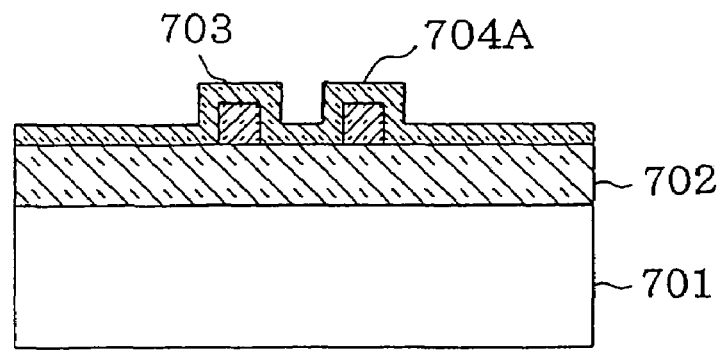
FIG. 23 is a cross-sectional view showing a method of manufacturing an optical waveguide circuit according to the sixth embodiment of the present invention in a step order.

FIGS. 19 to 22 and FIGS. 23 to 26 are manufacturing process views showing a manufacturing method of an optical waveguide circuit according to a sixth embodiment of the present invention. Lower cladding 602/702 and a first core layer are formed on substrate 601/701. The first core layer is selectively etched by photolithography and reactive ion etching to form first core 603/703. After that, second core layer 604A/704A is so formed on the lower cladding 602/702 as to cover at least the upper surface and both side surfaces of the first core 603/703 (FIG. 19 and FIG. 23).

Figure 20:
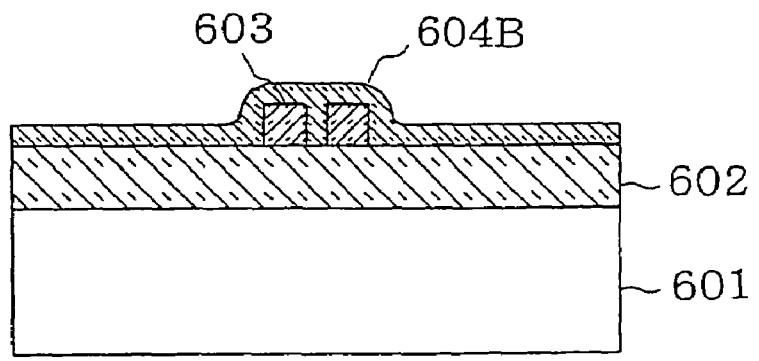
FIG. 20 is a cross-sectional view showing a method of manufacturing an optical waveguide circuit according to the sixth embodiment of the present invention in a step order.
Figure 24:
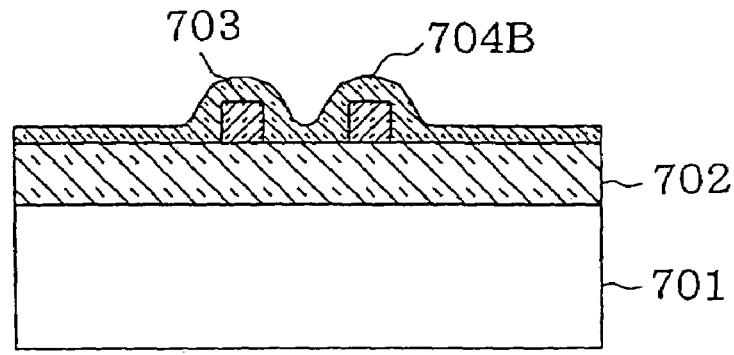
FIG. 24 is a cross-sectional view showing a method of manufacturing an optical waveguide circuit according to the sixth embodiment of the present invention in a step order.

The surface of the second core layer 604A/704A is made smooth by an application of heat-reflow process to form second core 604B/704B (FIG. 20 and FIG. 24). In this time, the reflow process temperature and time is controlled to allow the film thickness of the second core 604B/704B at the position between the first cores to change into a desirable shape depending on the interval between the adjacent first cores 603/703. That is, the film thickness of the second core 604B/704B is larger at the position where the interval between the first cores is narrow. Contrary, the film thickness of the second core 604B/704B is smaller at the position where the interval between the first cores is wide. In the above configuration, the film thickness is allowed to change smoothly.

Figure 25:
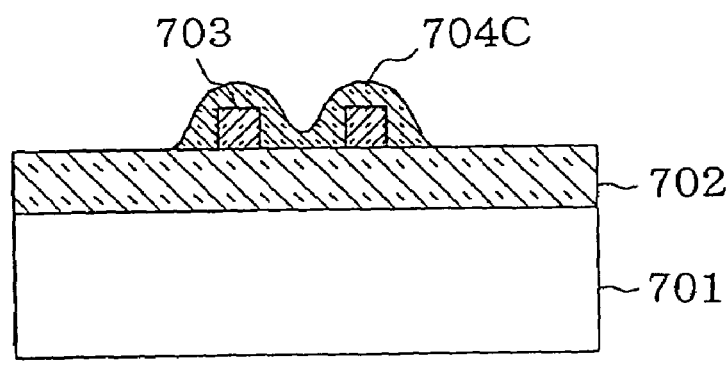
FIG. 25 is a cross-sectional view showing a method of manufacturing an optical waveguide circuit according to the sixth embodiment of the present invention in a step order.

After that, the second core 604B/704B at the position sufficiently apart from the first core 603/703 is removed, as needed, by etching to obtain second core layer 604C/704C (FIG. 21 and FIG. 25).

Figure 26:
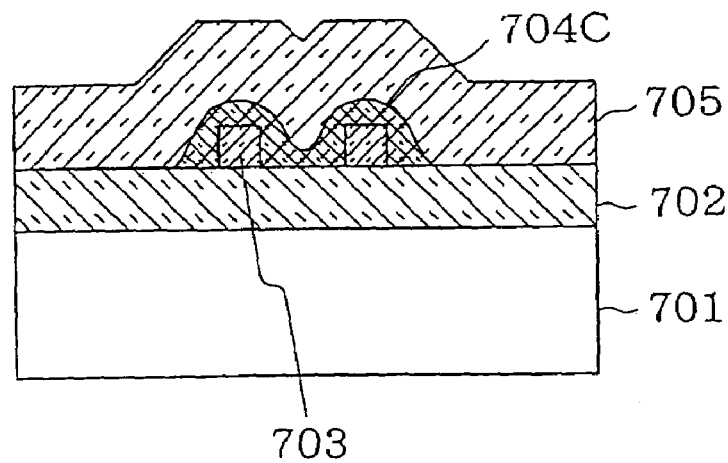
FIG. 26 is a cross-sectional view showing a method of manufacturing an optical waveguide circuit according to the sixth embodiment of the present invention in a step order.
Figure 27:
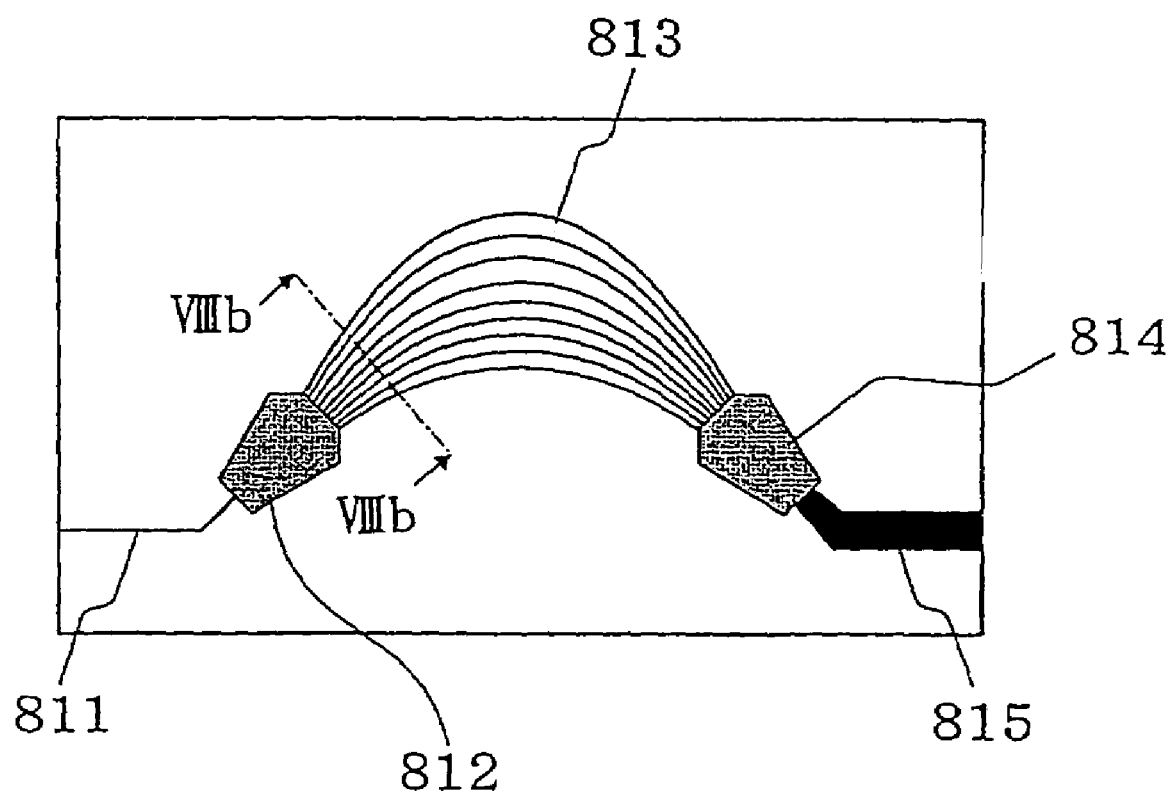
FIG. 27 is a top view showing a conventional optical waveguide circuit.
Figure 28:
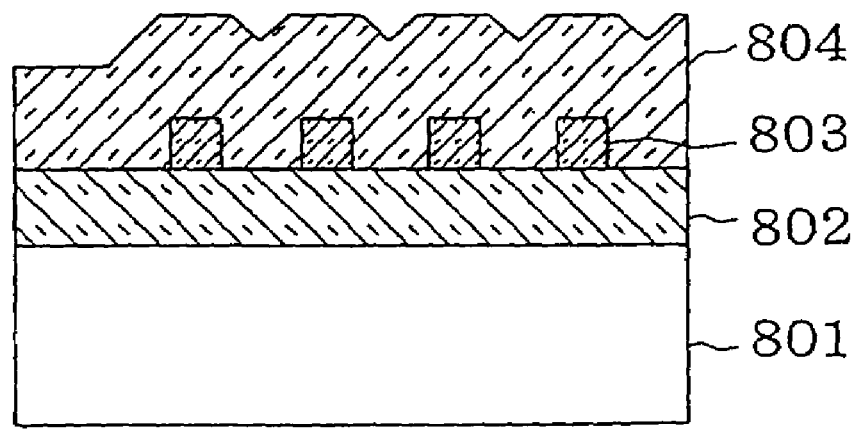
FIG. 28 is a cross-sectional view taken along the line VIIIb—VIIIb in FIG. 27.
Figure 29:
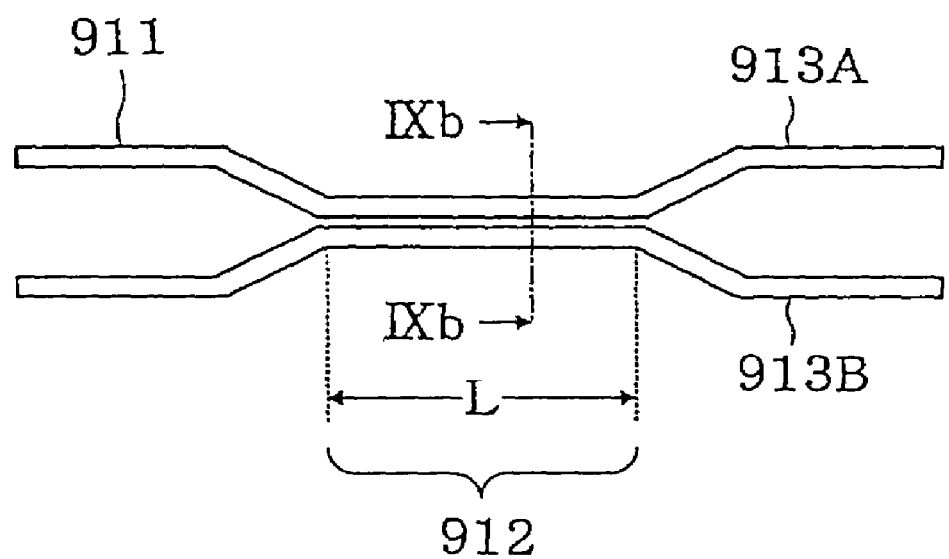
FIG. 29 is a top view showing a conventional optical waveguide circuit.
Figure 30:
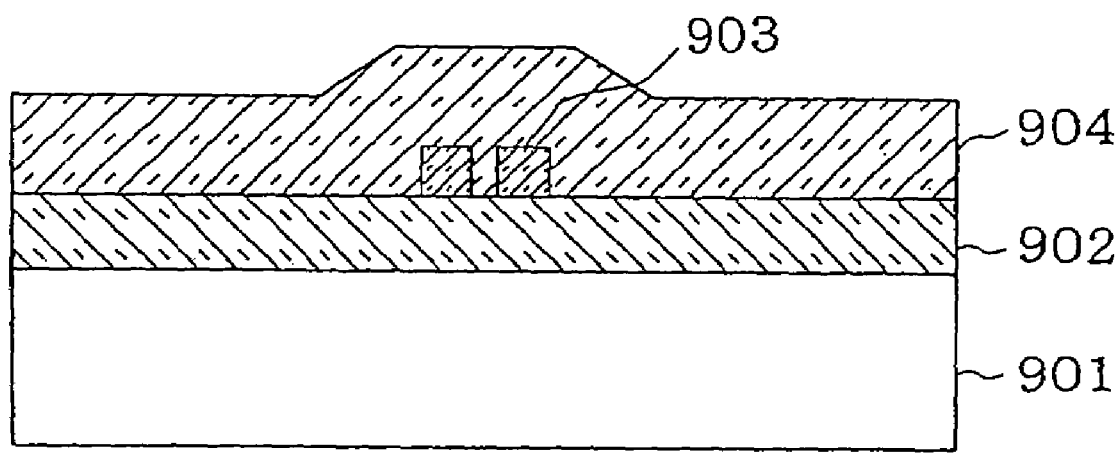
FIG. 30 is a cross-sectional view taken along the line IXb—IXb in FIG. 29.
Figure 31:
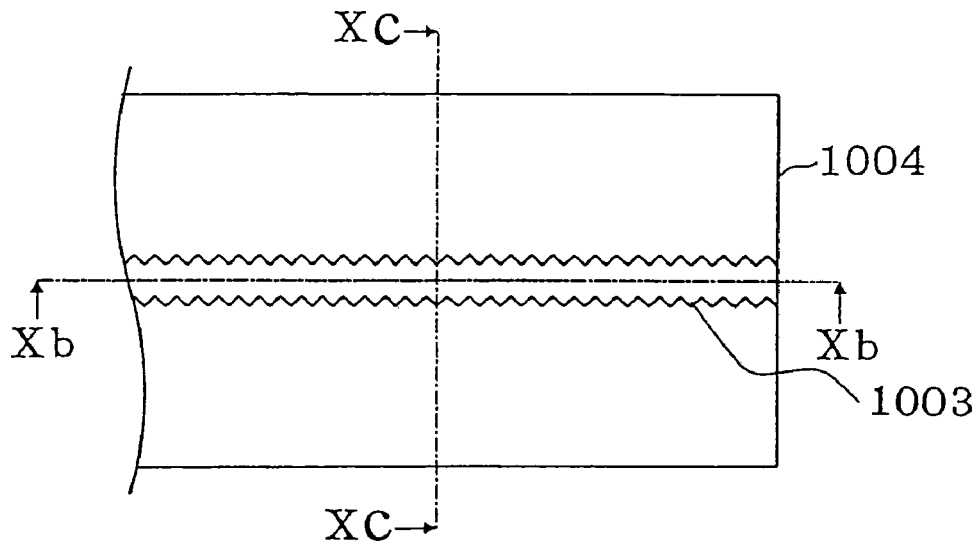
FIG. 31 is a top view showing a conventional optical waveguide circuit.
Figure 32:
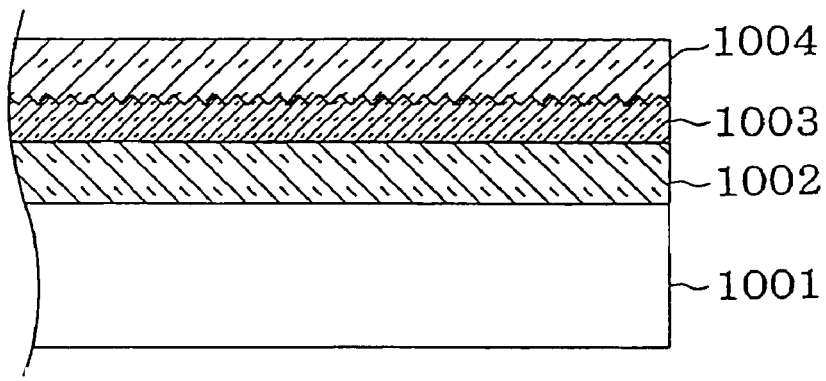
FIG. 32 is a cross-sectional view taken along the line Xb—Xb in FIG. 31.
Figure 33:
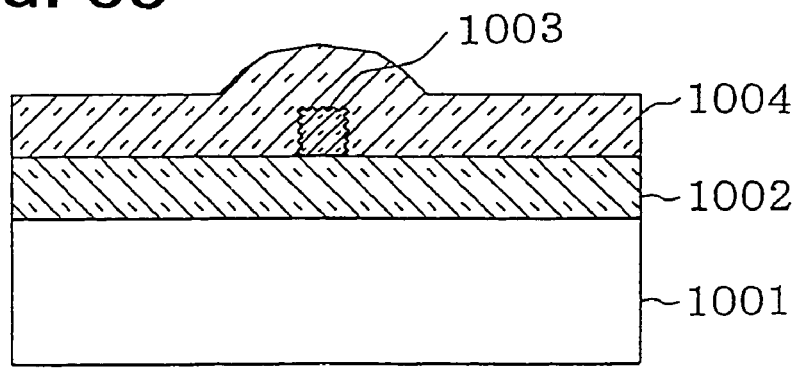
FIG. 33 is a cross-sectional view taken along the line Xc—Xc in FIG. 31.

Finally, upper cladding 605/705 is so formed on the lower cladding 602/702 as to bury the first core 603/703 and second core 604C/704C to complete the optical waveguide circuit (FIG. 22 and FIG. 26).

The material having a refractive index higher than the refractive indexes of the claddings 602 and 605/702 and 705 is used for the second core layer 604/704.

According to the experiment of the present inventor, a satisfactory shape of the second core 604B/704B was obtained by forming a BPSG to obtain the second core layer 604A/704A and by applying a heat reflow to the obtained second layer with a reflow process temperature of 850 to 1,200° C. and reflow process time of 1 to 5 hours in a nitrogen, oxygen, or helium gas atmosphere under the condition that, for example, the thickness of the first core 603/703 is set to 1 to 8 μm and that the minimum interval between the first cores is set to 1 μm.

A chemical vapor deposition (CVD) method, flame hydrolysis deposition (FHD) method, sputtering method or the like can be applied to the film formation of the upper and lower claddings 602, 605/702, 705, first core 603/703, and second core layer 604A/704A.

According to the manufacturing method of the sixth embodiment, the optical waveguide and optical waveguide circuit were manufactured using the materials and parameters described in the first to fifth embodiments. With this manufacturing method, the second core according to the first to fifth embodiments can be formed only through the film formation process and reflow process that have been already established as well-known techniques. As a result, it is possible to manufacture a low-loss waveguide, a branch/converging circuit or AWG with low-loss and low PDL, or a coupler with a short coupling length, in each of which variation of characteristics is minor in a wafer surface or between wafers and high manufacturing yield can be achieved.

INDUSTRIAL APPLICABILITY

As described above, the present invention relates to an optical waveguide circuit for use in optical communications and is effectively applied to a branch circuit, converging circuit, coupler, or the like.

The invention claimed is:

1. An optical waveguide circuit comprising:
   at least one optical waveguide; and
   a slab waveguide connected to said at least one optical waveguide,
   said at least one optical waveguide and slab waveguide comprising: a first core;
   a cladding that buries said first core; and
   a second core that is formed between said first core and cladding,
   wherein said second core is so formed throughout said at least optical waveguide and slab waveguide as to cover said first core,
   the refractive index of said second core is higher than the refractive index of said cladding, and
   the boundary between said second core and cladding is made smooth.

2. An optical waveguide circuit that allows an optical signal propagating through at least one optical waveguide to branch into a plurality of optical waveguides, or converges optical signals propagating through a plurality of optical waveguides into at least one optical waveguide, said at least one optical waveguide and plurality of optical waveguides comprising:
   a first core that branches from at least one core to a plurality of cores or that is converged from a plurality of cores into at least one core;
   a cladding that buries at least said first core; and a second core formed between said first core and cladding, wherein each interval between the branches of said first core that branches in the plurality of optical waveguides becomes wider as said first core gets away from a branch point or converging point of an optical signal, said second core of said plurality of optical waveguides is formed in the gaps between said branches of first core at the position in the vicinity of the branch point or converging point, said second core is so formed throughout said at least one optical waveguide and plurality of optical waveguides as to cover said first core, the refractive index of said second core 1S higher than the refractive index of said cladding, the boundary between said second core and cladding is made smooth, and the film thickness of said second core formed in the gaps between said branches of first core becomes thinner as the interval between said branches of first core becomes wider.

3. The optical waveguide circuit according to claim 2 wherein said optical waveguide circuit is a Y-shaped branch circuit.

4. An optical waveguide circuit comprising:
a first slab waveguide connected at least one input waveguide;
a second slab waveguide connected at least one output waveguide; and
arrayed waveguides formed between said first and second slab waveguides with optical path length differences,
said first slab waveguide, said second slab waveguide and said arrayed waveguides comprising: a first core that branches in the arrayed waveguides and that is converged into at least one core in said first or second slab waveguides;
a cladding that buries said first core: and
a second core formed between said first core and cladding, wherein said second core of said arrayed waveguides is formed in the gaps between the branches of said first core at connection areas between said first and second slab waveguides and said arrayed waveguides and the portion near the connection areas,
said second core is so formed throughout said first slab waveguide, arrayed waveguides, and second slab waveguide as to cover said first core,
the refractive index of said second core is higher than the refractive index of said cladding,
the boundary between said second core and cladding is made smooth, and
the film thickness of said second core formed in the gaps between said branches of first core of said arrayed waveguides becomes thinner as the interval between said branches of first core becomes wider.

5. An optical waveguide circuit comprising proximity waveguides in which a plurality of first cores are nearby arranged to each other,
said optical waveguide comprising:
a plurality of first cores;
a cladding that buries said first cores; and
a second core that is formed between said first cores and cladding to cover said first cores,
wherein said second core is formed in the gaps between said first cores in said proximity waveguides, and said second core is not formed in the gaps between said first cores in the waveguides other than said proximity waveguides, the refractive index of said second core is higher than the refractive index of said cladding, and
the boundary between said second core and cladding is made smooth.

6. The optical waveguide circuit according to claim 1, wherein said first core that is covered by said second core has a substantially rectangular cross-section, and said second core covers the upper surface and both side surfaces of said first core.

7. The optical waveguide circuit according to claim 2, wherein said first core that is covered by said second core has a substantially rectangular cross-section, and said second core covers the upper surface and both side surfaces of said first core.

8. The optical waveguide circuit according to claim 4, wherein said first core that is covered by said second core has a substantially rectangular cross-section, and said second core covers the upper surface and both side surfaces of said first core.

9. The optical waveguide circuit according to claim 5, wherein said first core that is covered by said second core has a Substantially rectangular cross-section, and said second core covers the upper surface and both side surfaces of said first core.

10. The optical waveguide circuit according to claim 1, wherein the thickness of said second core that covers at least a part of said first core is less than or equal to twice the thickness of said first core.

11. The optical waveguide circuit according to claim 2, wherein the thickness of the second core that covers at least a part of said first core is less than or equal to twice the thickness of said first core.

12. The optical waveguide circuit according to claim 4, wherein the thickness of said second core that covers at least a part of said first core is less than or equal to twice the thickness of said first core.

13. The optical waveguide circuit according to claim 5, wherein the thickness of said second core that covers at least a part of said first core is less than or equal to twice the thickness of said first core.

14. The optical waveguide circuit according to claim 1, wherein the refractive index of said second core is less than or equal to 1.01 times the refractive index of said first core.

15. The optical waveguide circuit according to claim 2, wherein the refractive index of said second core is less than or equal to 1.01 times the refractive index of said first core.

16. The optical waveguide circuit according to claim 4, wherein the refractive index of said second core is less than or equal to 1.01 times the refractive index of said first core.

17. The optical waveguide circuit according to claim 5, wherein the refractive index of said second core is less than or equal to 1.01 times the refractive index of said first core.

18. A manufacturing method of an optical waveguide circuit comprising: at least one optical waveguide; and a slab waveguide connected to said at least one optical waveguide, said method comprising at least the steps of:
forming a core layer;
selectively etching said core layer to form a first core throughout said at least one optical waveguide and slab waveguide;
forming a second core layer that covers the upper surface and both side surfaces of said first core, said second core layer being made of a material having a refractive index higher than the refractive index of said cladding;

applying a heat reflow to said second core layer to smooth the surface thereof to complete a second core; and forming said cladding on said second core.

19. A manufacturing method of an optical waveguide circuit that allows an optical signal propagating through at least one optical waveguide to branch into a plurality of optical waveguides, or converges optical signals propagating through a plurality of waveguides into at least one optical waveguide, said method comprising at least the steps of:

forming a core layer;

selectively etching said core layer to form a first core that branches from at least one core to a plurality of cores or that is converged from a plurality of cores into at least one core, each interval of the branches of said first core becoming wider as said first core gets away from a branch point or converging point of an optical signal;

forming a second core layer on the upper portion of said first core and between the branches of said first core throughout said at least one optical waveguide and plurality of optical waveguides, said second core layer being made of a material having a refractive index higher than the refractive index of said cladding;

applying a heat reflow to said second core layer to smooth the surface thereof and forming a second core such that the film thickness of said second core layer that is formed in the gaps between the branches of said first core becomes thinner as the interval between the branches of said first core becomes wider; and forming said cladding on said second core.

20. A manufacturing method of an optical waveguide circuit comprising: a first slab waveguide connected at least one input waveguide; a second slab waveguide connected at least one output waveguide; and arrayed waveguides including a plurality of cores and formed between said first and second slab waveguides with optical path length differences, said method comprising at least the steps of:

forming a core layer;

selectively etching said core layer to form said first core that branches in connection points between said first and second slab waveguides and arrayed waveguides in said first slab waveguide, arrayed waveguides, and second slab waveguide, each interval of the branches of said first core becoming wider as said first core gets away from a connection point between said first and second slab waveguides and the arrayed waveguides;

forming a second core layer on the upper portion of said first core and between the branches of said first core at least throughout said first slab waveguide, arrayed waveguides, and second slab waveguide, said second core layer being made of a material having a refractive index higher than the refractive index of said cladding;

applying a heat reflow to said second core layer to smooth the surface thereof and forming a second core such that the film thickness of said second core layer that is formed in the gaps between the branches of said first core becomes thinner as the interval between the branches of said first core becomes wider; and forming said cladding on said second core.

21. A manufacturing method of an optical waveguide circuit comprising proximity waveguides in which a plurality of first cores are nearby arranged to each other, said method comprising at least the steps of:

forming a core layer:

selectively etching said core layer to form the plurality of first cores;

forming a second core layer on the upper portion of each of said first cores and between said first cores, said second core layer being made of a material having a refractive index higher than the refractive index of said cladding;

applying a heat reflow to said second core layer to smooth the surface thereof to form a second core in the gaps between said first cores in said proximity waveguides such that said second core is not formed in the gaps between said first cores in the waveguides other than said proximity waveguides; and forming said cladding on said second core.

* * * * *